March 7, 1961 V. H. PEOPLES ET AL 2,973,884
SPREADER CONSTRUCTION
Filed March 20, 1957 7 Sheets-Sheet 1
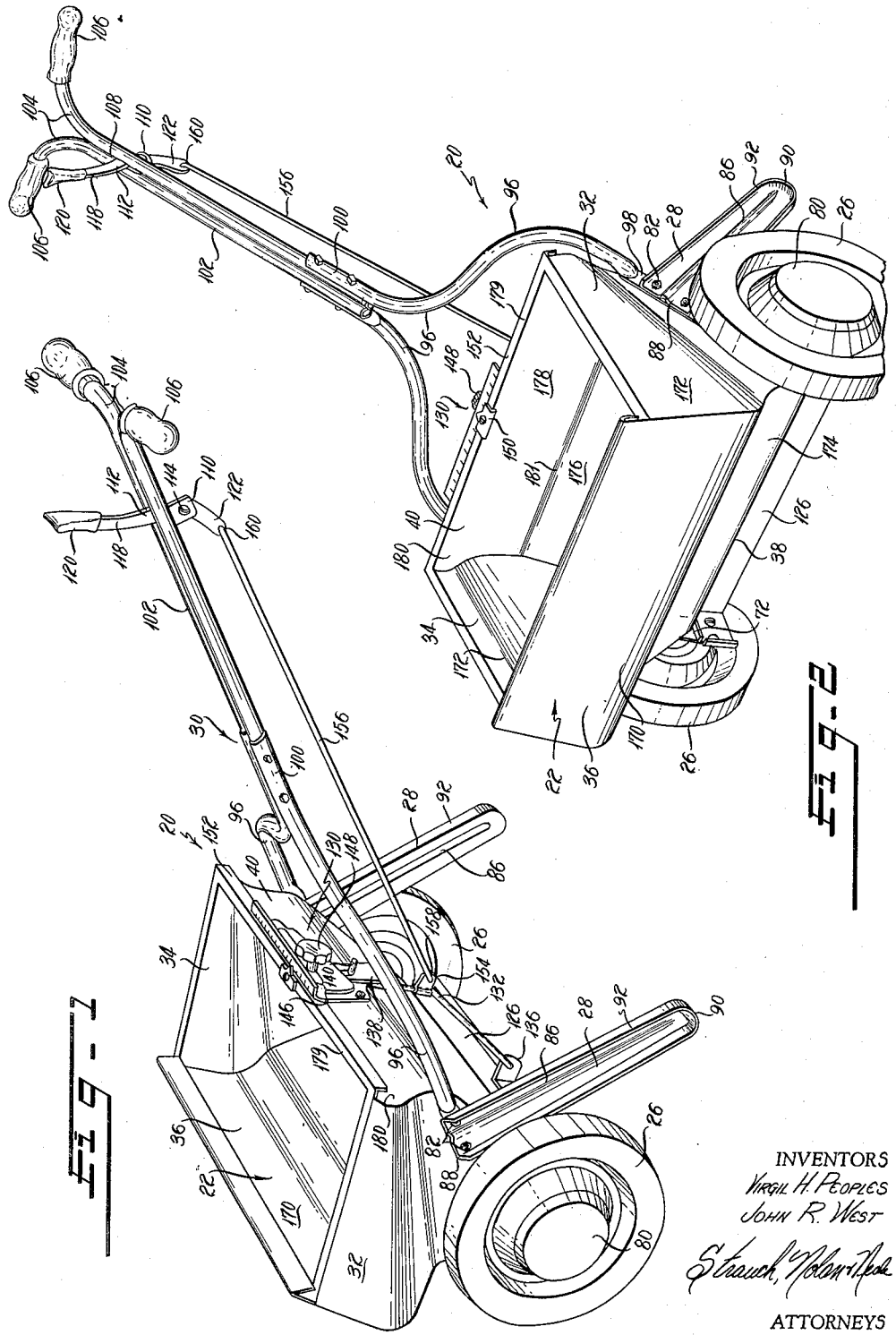
INVENTORS
VIRGIL H. PEOPLES
JOHN R. WEST
ATTORNEYS March 7, 1961
V. H. PEOPLES ET AL
2,973,884
SPREADER CONSTRUCTION
Filed March 20, 1957
7 Sheets-Sheet 2
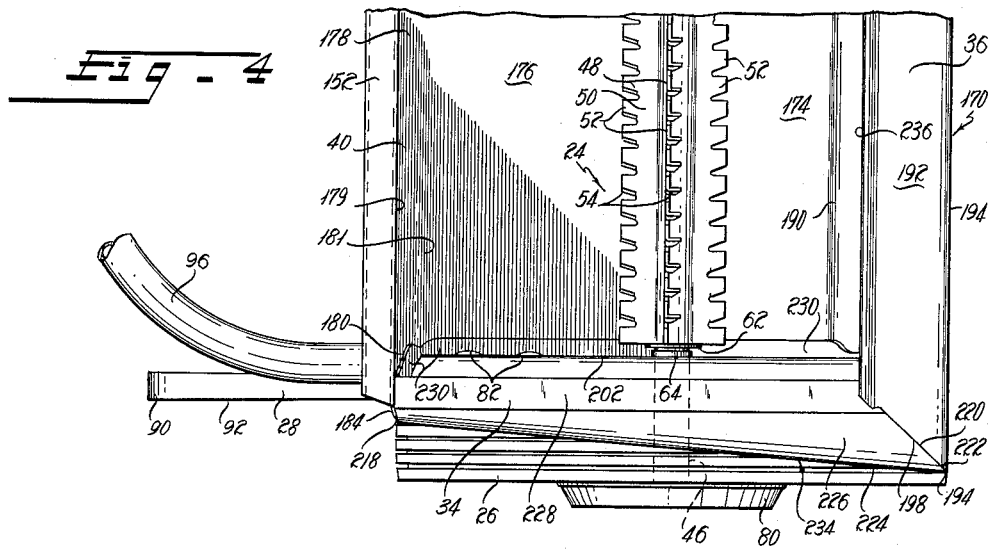
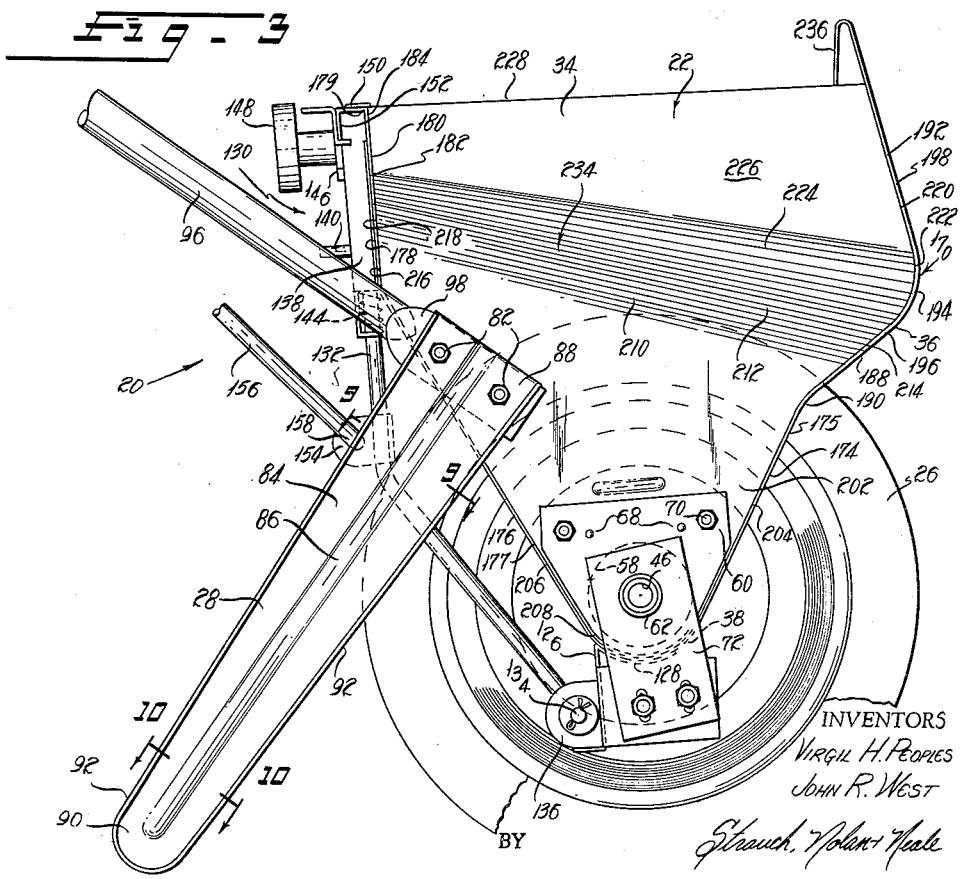
INVENTORS
VIRGIL H. PEOPLES
JOHN R. WEST
BY Strauch, Nolan & Neale
ATTORNEYS

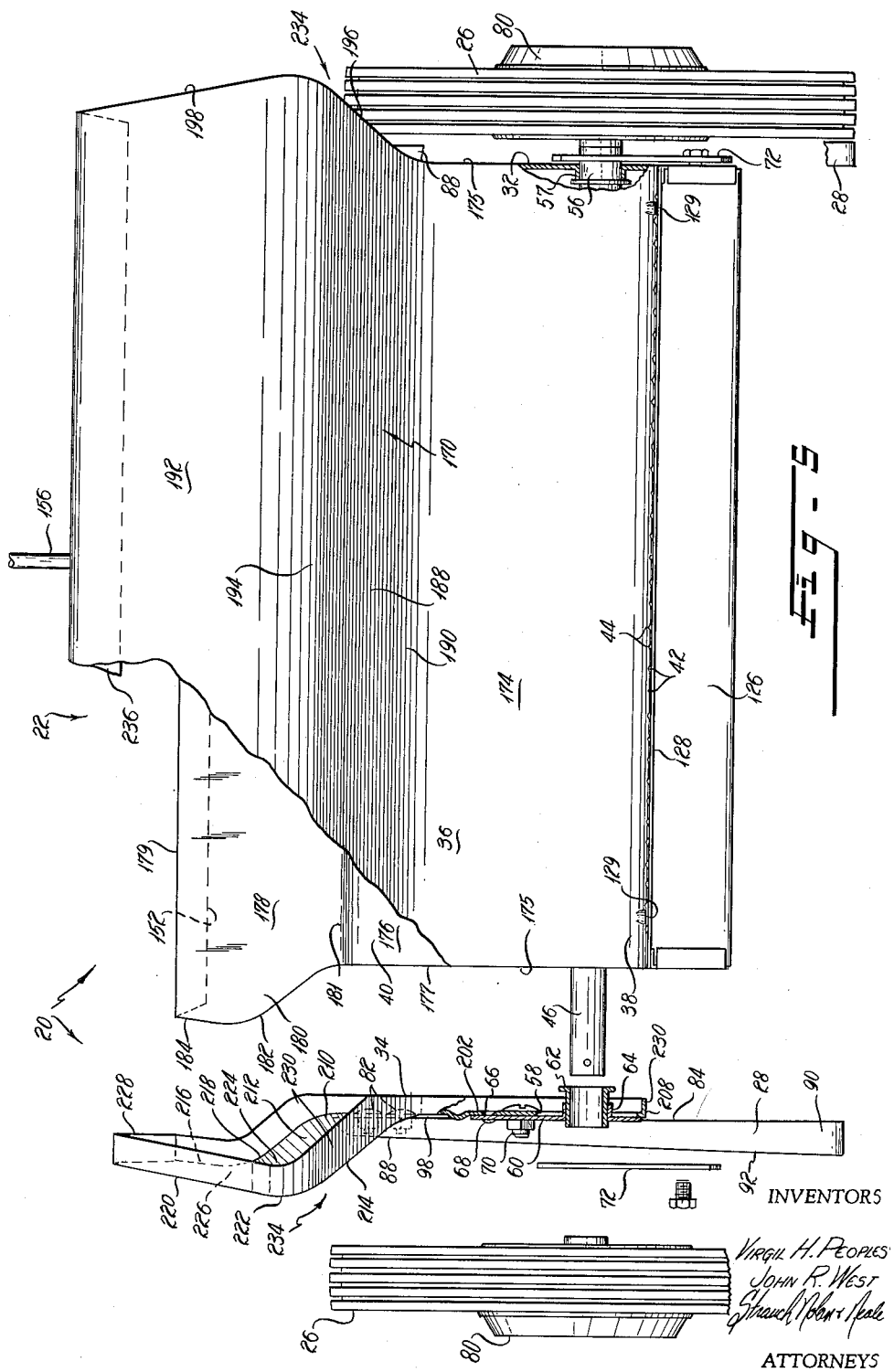

March 7, 1961 V. H. PEOPLES ET AL 2,973,884
SPREADER CONSTRUCTION
Filed March 20, 1957 7 Sheets-Sheet 4

INVENTORS
VIRGIL H. PEOPLES
JOHN R. WEST
BY Strauch, Nolan + Neale
ATTORNEYS

March 7, 1961

V. H. PEOPLES ET AL 2,973,884

SPREADER CONSTRUCTION

Filed March 20, 1957

INVENTORS
VIRGIL H. PEOPLES
JOHN R. WEST

BY

ATTORNEYS

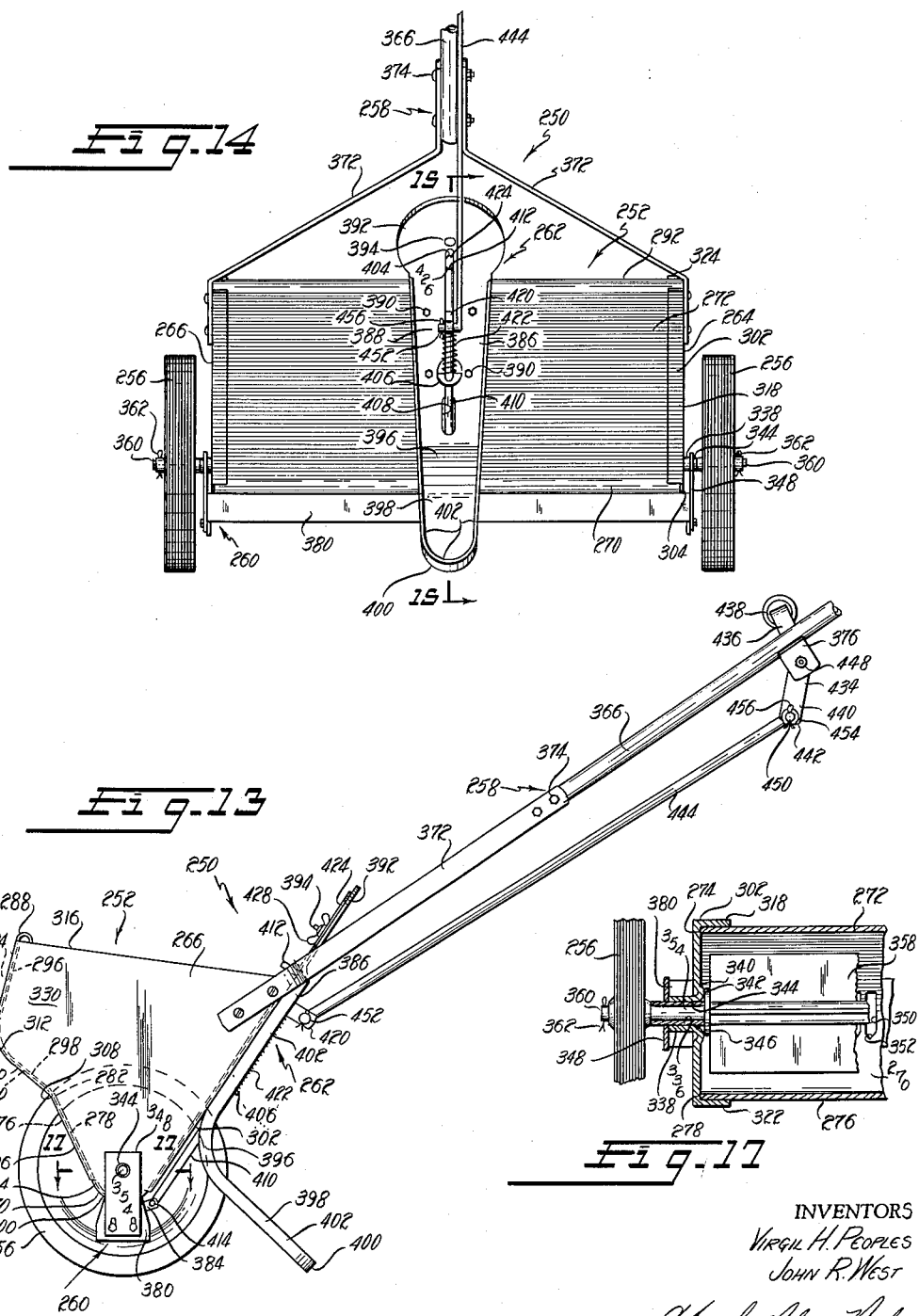

March 7, 1961
V. H. PEOPLES ET AL
2,973,884
SPREADER CONSTRUCTION
Filed March 20, 1957
7 Sheets-Sheet 7
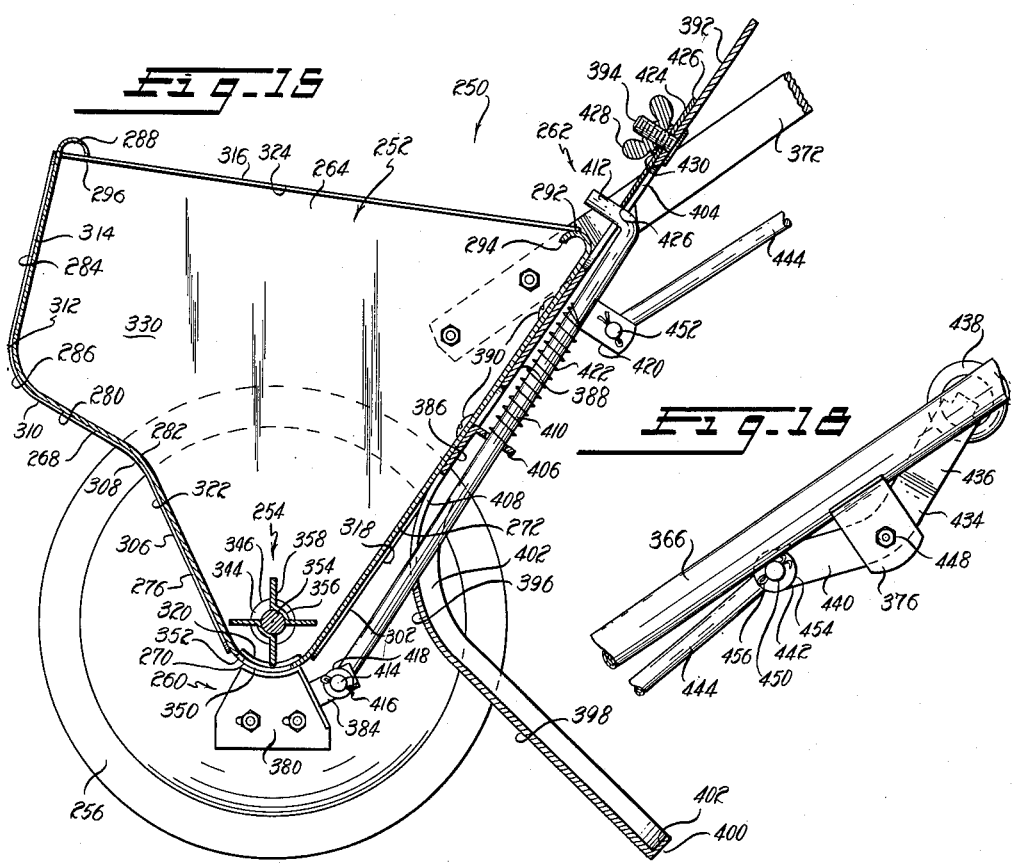
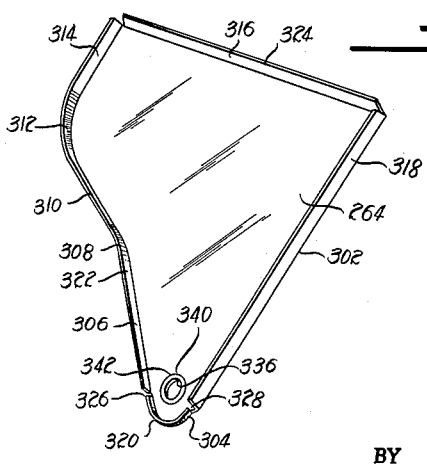
INVENTORS
VIRGIL H. PEOPLES
JOHN R. WEST
BY
ATTORNEYS United States Patent Office 2,973,884
Patented Mar. 7, 1961

2,973,884

SPREADER CONSTRUCTION

Virgil H. Peoples and John R. West, Marysville, Ohio, assignors to The O. M. Scott & Sons Company, Marysville, Ohio, a corporation of Ohio Filed Mar. 20, 1957, Ser. No. 647,229

5 Claims. (Cl. 222—177)

This invention relates to spreader construction and is particularly related to material distribution devices known as spreaders having self contained storage means with mechanism for controlled distribution of various materials such as grass seed, fertilizer, lawn treatment chemicals and the like.

Spreaders have been developed with a primary purpose of quickly and easily applying material to ground area more evenly and accurately than can be done by hand broadcasting. Although presently known spreaders do reduce the time required to make application of the material, a large percentage of the operator's time, approximately one third, is spent in loading the storage bin or hopper of the spreader. The percentage of total time which in involved in loading the spreader hopper can be reduced by increasing the hopper capacity and what appears to have been the universal manner of increasing capacity was merely to increase the hopper length, width or height or combinations of such dimensions. Such an obvious and conventional way of increasing capacity has disadvantages in production of the spreader as well as in consumer use. Merely adding length, width or height to a hopper results in larger overall spreader dimensions and requires larger warehouse storage space, larger shipping containers and increases the storage space required by the user. Furthermore, the method of increasing hopper capacity by increasing overall dimensions results in a considerable increase of weight not only due to larger areas of hopper walls but because it was invariably necessary to go to heavier gauge wall material to provide necessary rigidity and ruggedness.

Previously used spreader construction resulted in sharp external projections which would snag clothes and cut hands. Another problem results from the spreader agitator action which causes material to work up toward the top of the hopper and overflow if the hopper is filled near capacity and gusts of wind across the open top of full spreaders blow material past the edges of the hopper and with certain chemicals and fertilizers, can cause damage to the operator's body and clothes.

Early spreaders, exemplified by United States Patents Nos. 1,888,821 to G. V. Fearn and 1,948,861 to W. L. Lindgren, utilized an essentially four sided hopper with tapered front and rear walls and invariably incorporated outwardly projecting top stiffening edge flanges. To add to capacity of such early style hopper, vertically extended top walls were added as exemplified by United States Patent No. 2,193,253 to E. L. Masters and the United States Reissue Patent No. 24,189 to V. H. Peoples. This more recent type spreader retained the outwardly projected top edge flanges and even the joinder flanges between the side walls and the front and rear walls of the hopper were outwardly projected.

The spreader construction of this invention was developed to overcome the aforementioned disadvantages of previously known spreader construction. To increase the material carrying capacity of the hopper without increasing overall dimensions, the sides of the hopper above the side wheels are bulged outwardly to overhang the wheels thus utilizing space entirely ignored in normal spreader construction, and which space is wasted in warehouse storage, shipping containers and user storage. In operating position, the spreader handle arrangement is so disposed to provide a forward tilt to the median plane between inclined lower portions of front and rear walls which result in a slight inward inclination of the upper portion of the rear wall. The upper half of the front wall has been bulged forwardly providing increased capacity, balancing the weight of the loaded hopper and resulting in a convergent operational relationship between the upper portions of front and rear walls. The accumulated increased capacity of these features is approximately 40 percent higher than the capacity of a conventional flat walled spreader having similar overall configuration dimensions, and reduces the total time required to make application to a given area by 20 percent.

By tapering the side, front and rear walls of the hopper inwardly toward the top and turning some or all of the top edge flanges of front and side walls inwardly instead of outwardly, the hopper can be filled essentially to the top and material is prevented from flowing over the sides due to agitator action and the loss and danger of wind blown material is greatly reduced. The welded joinder flanges between the sides and the front and rear walls are bent inwardly to lap adjoining wall surfaces, increasing capacity without increasing overall dimensions and reducing sharp outward projections which were present in previously known spreaders.

An important advantage of this invention is in the increased hopper strength resulting from the use of reversely contoured areas and/or curvatures in the various wall portions and their edges which meet and are welded along reversely directed joinder lines in some cases being three dimension joinder lines which result from adjoining walls with compound curvatures. The hopper does not twist and bend under the strain of load weight and operation as do the ordinary flat wall box type hoppers which have no reversely directed or three dimensional joinder lines. Increased load weight due to the forty percent higher capacity can be handled by a hopper constructed according to this invention with no twisting or bending and there is no necessity of using a heavier gauge metal than would be used in an equivalent overall dimension flat walled hopper. A spreader made in accord with the disclosure of the aforementioned United States Reissue Patent No. 24,189 having a hopper capacity of 940 cubic inches will have the same overall storage dimensions as a 1440 cubic inch capacity spreader built in accord with principles of this invention.

There is a consumer demand for small inexpensive spreaders, which are made of lightweight material and normally have simple rate controls mounted on the handle structure in order to remain competitive in a low priced field. Certain of the aforementioned inventive concepts can be advantageously utilized in a small lightweight spreader to provide higher capacity, more rigidity and better control than has been present in previously known lightweight, inexpensive spreaders. A front wall bulge similar to that discussed hereinbefore, and which increases capacity over straight walled hoppers approximately 15 percent, is used. Furthermore, inturned flanges at the wall joinder edges together with the inturned lips around the top edge which permit the hopper to be filled to its capacity without danger of overflow, add approximately 15 to 20 percent additional useful capacity over that which was available in previously known straightwalled hoppers of equivalent dimension. To meet competition, it is essential that the cost of control structure be kept as low as possible. New inventive concepts in the support and distribution control mechanism aid in producing an inexpensive, lightweight yet rugged and conveniently controllable spreader, nevertheless, proven control principles disclosed in the aforementioned United States Reissue Patent No. 24,189 are desired and have been used in a new combined support and adjustable rate and distribution control structure. By extending the rate control support structure to serve as a single support leg, material, production and assembly costs are greatly reduced. Mounting of the rate adjustment mechanism on the hopper where handle deflection, which is almost invariably present in spreaders, cannot affect outlet opening and use of the desirable overcenter locking in the control member for opening and closing the outlet, is now provided by inexpensive structure, which enables a competitive advantage in the low priced field. Small spreaders, on the market today, lack the strength, capacity, positive control and assured adjustment of a small spreader constructed in accord with principles of this invention.

Accordingly, a primary object of this invention resides in the provision of spreaders incorporating novel hopper wall construction enabling highly increased capacity without increasing overall spreader dimensions. An associated object resides in the provision of the novel bulged wall, higher capacity hopper construction without necessitating an increase in the gauge of metal over that for a spreader of equivalent overall dimensions.

Another object resides in the provision of a novel spreader hopper having a bulged upper portion of its forward wall to provide a balanced load of increased capacity. It is commensurate with this object to provide the hopper with novel inturned top flanges to provide a windbreak and to prevent overflow due to agitator action.

A further object resides in the provision of a novel spreader hopper having front, rear and side walls formed with compound surface formations and curvatures particularly along the joinder edges between wall portions to provide strength and resistance to twisting and bending under increased load. It is also an object to provide by such formations and curvatures in hopper walls, increased capacity realized by bulged side wall portions which overhang the spreader wheels.

Still another object resides in the provision of novel overflow and windage deflection control in a material spreader by tapering the walls inwardly adjacent the upper portion of the spreader hopper and by the provision of inwardly projected edge flanges at the top of the hopper. An aid to realizing this object is the novel provision of an upstanding, and inwardly turned, forward edge deflection vane.

Further novel features and other objects of this invention will become apparent from the following detailed description, discussion and the appended claims taken in conjunction with the accompanying drawings showing preferred structures and embodiments, in which:

Figure 1 is a perspective view from the rear illustrating a preferred spreader constructed in accord with this invention;

Figure 2 is a perspective view from the front illustrating the spreader shown in Figure 1;

Figure 3 is a side elevation view of the spreader of Figure 1 with the near wheel removed to illustrate details of hopper construction;

Figure 4 is a partial plan view of the spreader of Figure 1 illustrating hopper features including the overhang above the wheel;

Figure 5 is a front elevation of the spreader of Figure 1 exploded at one side to illustrate hopper configuration and side plate configuration;

Figure 13 is a side elevation of the spreader of Figure 11 with the near wheel deleted to show hopper and control details;

Figure 14 is a rear elevation view of the spreader of Figure 11 illustrating the combination hopper leg and control structure;

Figure 15 is an enlarged detail section taken on line 15—15 of Figure 14 illustrating the control linkage to the hopper discharge;

Figure 16 is a perspective detail view illustrating the inside of a side plate used for the spreader of Figure 11;

Figure 17 is a section taken on line 17—17 of Figure 13 illustrating the agitator axle opening and bushing; and Figure 18 is a detail side view of the control lever of the spreader in Figure 11, in a closed shutter position illustrating the lower lever arm in limited position past a dead center between the lever pivot and shutter pivot.

Figure 6:
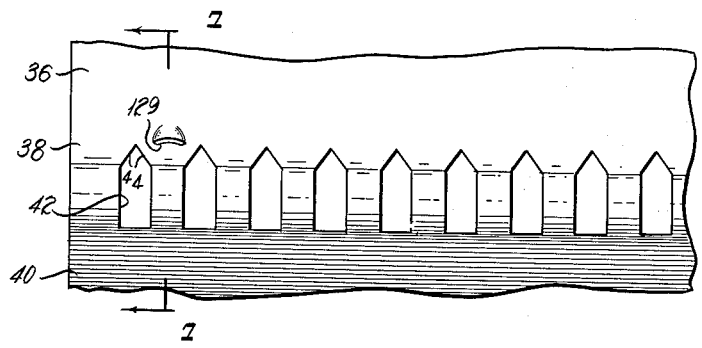
Figure 6 is a detail view from below showing aperture outlet formation.
Figure 7:
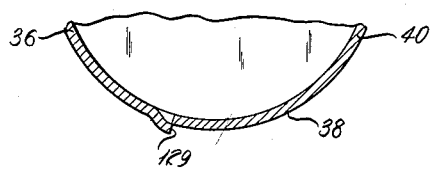
Figure 7 is a section taken on line 7—7 of Figure 6 illustrating a hopper detail.

With specific reference to the embodiment illustrated in Figures 1–7 a spreader 20 consists of a hopper 22, agitator assembly 24, wheels 26, legs 28, handle assembly 30 and material distribution control mechanism to be briefly described hereinafter.

Hopper 20 has side plates 32 and 34 secured (Figures 3 and 5), as will be later fully described, to front, bottom and rear walls 36, 38 and 40 respectively, which comprise a single sheet of material. Bottom 38 constitutes a curved transition between the front and rear walls, having a cross section of essentially constant radius. The lower portions of the side plates 32 and 34 are substantially vertically disposed and, with bottom wall 38 and the lower portions of the front and rear walls 36 and 40, provide a downwardly convergent hopper with a laterally straight bottom wall 38 rounded in the fore and aft direction. A lateral row of elongate apertures 42 are formed in the rounded bottom wall 38 and the front end portions 44 of the aperture edges are convergent (Figures 5 and 6).

Agitator assembly 24 (Figure 4) has a shaft 46 with two double vane sets 48 fixed thereto as by welding. Each vane set 48 has two vanes 50 disposed on radial planes through the axis of shaft 48 and extending from adjacent one side plate 32 to adjacent the other side plate 34. Vanes 50 have a plurality of radial outwardly tapered blades 52 formed by making a series of cuts from the outer edge of vane 50 and bending a small wing tab 54 forward along the side of each blade 52. Wing tab 54 is bent in a direction to lead the blade 52 during agitator rotation.

The number and lateral space relationship of the blades 52 on each vane 50 correspond to the number and spacing of each aperture 42 in hopper bottom 38 and during rotation each blade 52 will pass over an associated aperture 42, the radially outer edge of each wing tab 54 passing along a path above and adjacent a side edge of the aperture 42 associated with the blade 52 which carries the wing tab. The agitator construction and its association with the hopper discharge openings is fully described in United States Patent No. 2,753,086 to George D. Tuttle, to which reference may be had if details are desired.

Agitator shaft 46 is journalled in side plates 32 and 34 on an axis substantially coincident with the axis of the curved bottom 38 and is disposed so the tips of blades 52 have only a slight clearance above the bottom surface of the hopper during agitator rotation. One end of the shaft 46 projects through and is journalled in a flanged bushing 56 disposed through an axially flanged aperture 57 in side plate 32. The opposite side plate 34 (Figure 3) has a circular aperture 58 large enough to permit insertion of the agitator assembly 24 into the hopper 22 so an end of shaft 46 projects through bushing 56 in side plate 32. A journal plate 60, carrying a flanged bushing 62, disposed through an axially flanged aperture 64, fitted over the other end of shaft 46, is accurately located and secured to side plate 34 by matched dimples 66 and 68 and bolts and nuts 70. Axially flanged apertures 57 and 64 are similarly shaped, and the flanged bushings 56 and 62 are similar, the bushings each being disposed with their flange portion on the inside of hopper 22 and cooperating with the end edges of vane sets 48 to be thereby retained in the hopper side plates.

Bushings 56 and 62 project a short distance beyond the exterior surface of the hopper (Figure 5) and each journals a depending bracket plate 72 for a purpose to be hereinafter described.

A wheel 26 is coaxially mounted on each projected end of agitator shaft 46, one of the wheels being keyed to the shaft and the other rotatably mounted and retained by a washer and cotter pin. In this manner, movement of spreader 20 over the ground will provide drive engagement through one wheel to rotate the agitator assembly 24 while the other wheel is freely rotatable. A preferred wheel construction is fully disposed in copending application Serial No. 615,277 filed October 11, 1956 by A. D. Ellies. Sufficient for this invention is the fact that the large diameter hub-caps 80 are made of a semi-rigid elastomeric material such as rubber or a plastic and project beyond the tire profile. Such hub-caps 80 provide a large resilient buffer effectively preventing the skinning of shrubs and trees which may be inadvertently bumped during spreader operation, and also act to prevent the projected shaft ends from snagging chain link and picket fences.

The rest position of spreader 20 is (Figure 3) determined by two legs 28 which are fastened on the exterior of side plates 32 and 34 by bolts and nuts 82, and extend downwardly and rearwardly. Both of legs 28 are identical and are made of sheet metal stampings with a central elongate portion 84 having a longitudinal rib deformation 86 extending from upper end 88 to a position adjacent lower rounded end 90. Leg portion 84 and rib deformation 86 have a slight convergent taper from upper end 88 toward lower end 90 (Figures 3, 5, 9 and 10). An edge flange 92 extends from a corner of upper end 88 along one side, around the curved end 90 and back along the opposite side to the other corner of end 88 and is of relatively narrow width at upper end 88, becoming progressively wider as rounded end 90 is approached.

Flange 92 and rib deformation 86 provide great structural rigidity to the sheet metal leg 28 and the cooperative tapering configuration of leg 28, rib 86 and flange 92 enable approximately equivalent strength at both ends of the leg with a relatively wide ground engaging portion of flange 92 at lower end 90 and a shallow wide portion at upper end 88. Bolt holes are symmetrically located on either side of the longitudinal center line of leg 28 in the wide shallow upper end 88. The shallow symmetrical configuration of end 88 enables the legs to be fastened to and engage a large handle assembly surface on either of hopper side plates 32 or 34 and permits ready access to assemble or disassemble the aforementioned bolts and nuts 82.

The tubular handle assembly 30 (Figures 1, 2 and 3) consists of two similar, bent tubular arms 96 each having its lower end 98 pressed flat and provided with bolt holes enabling the ends 98 to rest firmly against the hopper side plates 32 and 34 under the ends 88 of legs 28 and be secured by the bolts and nuts 82. The upper ends 100 of tubular arms 96 are pressed together in a curved configuration and extend for a short distance in spaced parallel fashion. An upper handle bar portion 102 of assembly 30 is made of two tubular rods welded side by side and having their upper ends 104 bent apart to form handles upon which are placed grips 106.

Figure 8:
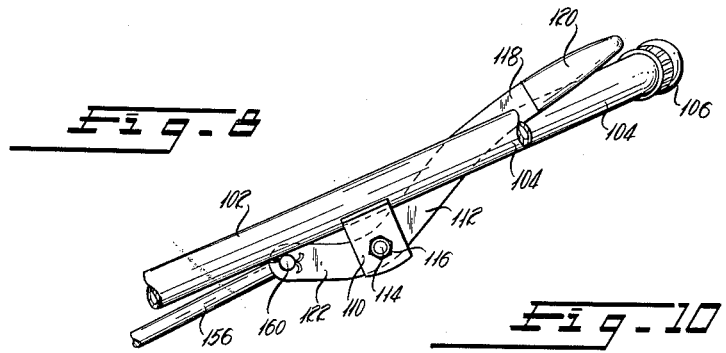
Figure 8 is a side view of the upper handle bar assembly partially broken away and illustrating the control lever in an overcenter locked position wherein the outlet shutter is in a closed position.
Figure 9:
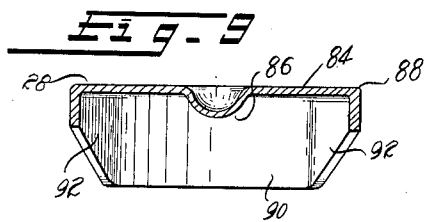
Figure 9 is a section through the upper portion of the leg taken on line 9—9 of Figure 3.
Figure 10:
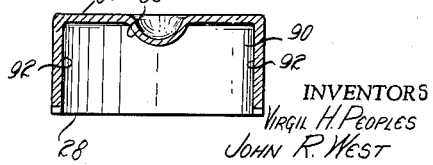
Figure 10 is a section through the lower portion of the leg taken on line 10—10 of Figure 3.

The two rods of bar 102 are slightly deformed just below upper handle ends 104 to provide a slot 108 below which, two depending brackets 110 are welded. A lever 112 (Figures 1, 2 and 8) is disposed through slot 108 and pivotally mounted by a bolt 114 and lock nut 116. The end of an upper arm 118 on lever 112 carries a wedge shaped flared end knob 120 and the lever is so shaped that lower arm 122 will abut bar 102 when the wedge shaped knob on arm 118 is approximately aligned with the top of handle grips 106 which position is shown in Figure 8 and has a specific purpose as will become clear.

Construction of the material distribution control mechanism, with the exception of the specific location of lever arm 118 and knob 120, is substantially identical to that disclosed in the aforementioned United States Reissue Patent No. 24,189 and will be only briefly described in this specification. A shutter plate 126 (Figures 3 and 5) has end flanges fastened in an adjustable manner to the aforementioned depending bracket plates 72. The upper portion of plate 126 has a curved contour with a straight lateral front edge 128 and is disposed in a snug free swinging fit under the curved hopper bottom 38. The upper portion with front edge 128 cooperates with the discharge apertures 42 to control the size of all discharge openings or cover all discharge openings dependent upon the pivotal position of shutter plate 126. As the shutter 126 is pivoted to open the apertures 42, the leading edge 128 is shifted from the front toward the rear. To aid in proper assembly of shutter 126 two small projections 129 are punched from the hopper bottom wall 38 with edges essentially aligned with the leading edges of apertures 42. The stop projections 129 are abutted by the shutter leading edge 128 before it is tightly secured to bracket plates 72 thus assuring its parallel assembly relative to apertures 42.

Operational adjustment of the shutter 126 is determined by a rate control assembly 130 (Figures 1 and 3) mounted on the rear wall 40 of hopper 22 and consisting of a rod 132 with a bent lower end 134 pivotally engaged in a hole formed in a control shutter lug 136. Rod 132 has an intermediate bend and extends vertically along the exterior of rear hopper wall 40 into a box-like bracket 138 adjacent the upper edge of rear wall 40. The rod 132 projects through a lower flange of bracket 138 and has an upper end 140 bent rearwardly and projecting through a vertical slot 142 in bracket 138. A compression spring 144 on rod 132, inside the bracket 138, cooperates between the bracket and rod 132 to bias the rod upwardly and pivot shutter 126 to the rear, which movement will uncover discharge apertures 42. A cam plate 14 is slidably fastened to the upper part of bracket 138 by a stud welded on bracket immediately above slot 142 and a suitable cooperating nut encased in knob 148. Scale indications are provided on a top flange of cam plate 146 and cooperate with an indicator 150 bolted on the turned rear edge 152 of hopper rear wall 40. Lugs on cam plate 146 are disposed under the turned rear edge 152 of hopper 22 to maintain the cam plate in horizontal position.

Depending upon the laterally adjusted position of cam plate 146, rod 132 can be permitted to move under bias action of spring 144 to a predetermined position where the upper bent end 140 engages the inclined lower edge of cam plate 146. This abutment limits and determines pivotal position of shutter 126 to uncover the desired extent of outlet apertures 42.

An apertured ear 154 is fixedly secured to rod 132 adjacent its intermediate bend and an operating rod 156 with bent ends 158 and 160 is pivotally connected to ear 154 and the apertured lower arm 122 of control lever 112. When lever 112 is positioned with the upper pivot end 160 of operating rod 156 below a line between the lever pivot bolt 114 and the lower pivot end 158 of rod 156, the entire linked assembly of shutter 126, vertical rod 132, operating rod 156 and lever 112 will be biased by spring 144 to a position where rod end 140 engages the cam plate 146.

When knob 120 of control lever 112 is pulled back to limit position, as seen in Figure 8, its lower lever arm 122 moves the upper pivot end 160 of operating rod 156 past dead center between lever bolt 114 and lower rod end 158, the operating rod 156 is moved down, forcing rod 132 forward and down against spring bias to move shutter 126 to close the outlet apertures 42. Bias force of the sping 144 tends to force operating rod 156 toward the handle but such movement is prevented by the aforementioned overcenter condition of the connection between lever 112 and rod 156. Inasmuch as the rigidly fixed spreader structure such as hopper 22 and the handle assembly 30, and the moving link structure of the shutter end pivot brackets 72, the shutter 126, the vertical rod 132, operating rod 156 and lever 112 constitute a link mechanism the spring connections could be properly made between different ones of the relatively shiftable links in the mechanism and the same biasing function would result, although location of spring 144 between bracket box 138 and rod 132 is preferable since it conveniently results in a strong aligned biasing force on rod 132 and the spring is placed in a protected location.

As previously described, the flat wedge shape control lever knob 120 (Figure 8) is so disposed and the upper arm 118 of lever 112 is so shaped to position arm 118 between the upper extent of the dual rods of handle bar 102 and the contoured flat end of knob 120 substantially aligned with the top surface of grips 106 when the control mechanism is in a closed outlet position. In such position a person operating the spreader can keep both hands on the grip 106 and, using a thumb under the edge of knob 120, raise the lever arm 118 a slight amount. This slight movement will pivot lever 112 to move the lower arm 122 downward and past a dead center position whereupon the bias force of spring 144 will be effective to move and retain the control mechanism to and at an outlet open position as predetermined by the setting of cam plate 146. The operator, by keeping both hands on the handle assembly during alignment of the spreader with the area to be treated, can prevent overlap or misalignment of treated areas.

*Hopper construction*

Figures 1 and 2 illustrate the relationship between bulged upper part 170 of front wall 36 and the upper bulged overhang 234 of side wall plates 32 and 34. The shapes and contours of side wall plates 32 and 34 are mirror counterparts and the same reference numerals will be used in describing counterpart portions of both plates.

In Figure 3, the side view contour of hopper 22 is clearly shown and it will be seen that front wall 36, bottom 38 and rear wall 40 constitute a unitary sheet which is joined along its side edges to side plates 32 and 34. Approximately the lower half 174 of the front wall 36 and approximately the lower three-quarters 176 of rear wall 40 are essentially planar rectangular areas convergent downwardly at an acute angle to their integral joinder with rounded bottom 38. Side edges 175 of front lower portion 174 and side edges 177 of rear wall lower portion 176 are disposed in a common vertical plane (Figure 5). In a resting position of the spreader 20 (Figure 3), a median plane between convergent front and rear wall lower portions 174 and 176 will be inclined slightly to the rear of the spreader and the upper portion 178 of rear wall 40 is planar and substantially parallel to the aforementioned median plane. The top turned edge 152 of rear wall is bent back at 179 and down as hereinbefore described. As shown in Figure 5, the sides 180 of the rear wall upper portion 178 extend beyond the width of lower portion 176 having edges 182 curved in an S-shape with the upper extent 184 of edge 182 turning slightly inwardly.

The bulged upper part 170 of front wall 36 seen in Figure 3 is constituted by an intermediate portion 188 which is inclined forwardly, relative to the front wall lower portion 174, from bend line 190 and an upper portion 192, which is inclined rearwardly relative to the aforementioned median plane. The transition bend 194 between intermediate portion 188 and upper portion 192 has a curved contour. Note, that the inclination of the upper front wall portion 192 toward the median plane results in a convergence between the upper front and rear wall portions 192 and 178 and, in the desired operating position of the hopper 22, the upper front and rear walls will both have a convergence toward a vertical plane through the agitator axis. This relationship aids in preventing overflow due to material being pushed up by agitator rotation.

The side edges 196 of the front wall intermediate portion 188 flare outwardly (Figure 5) from bend line 190 to a position coincident with the curved bend 194 and the side edges 198 of front wall upper portion 192 converge inwardly from curved bend 194 to a position substantial in fore and aft alignment with the corresponding top corner of rear wall 40. The front wall side edge is composed of edge portions 175, 196 and 198 and cannot be truly represented as is a straight line by a single dimension nor do the edges all lie in the same plane and the same is true of the rear wall side edge composed of edge portions 177 and S-curve 182. For purposes of this invention the line formed by front and rear wall side edges will be designated a three dimensional line.

Referring now to Figures 3 and 5, each of the side plates 32 and 34 has a lower planar portion 202 with front and rear edges 204 and 206, respectively convergent at an acute angle equal to that between the lower front and rear wall portions 174 and 176, joined at the bottom by a circular curved edge portion 208. Rear edge 206 terminates at a position corresponding to the rear wall bend line 181 (Figure 3) and front edge 204 terminates at a position corresponding to the front wall bend line 190. Viewing Figures 3 and 5 with the aid of the perspective view Figure 1, it will be seen that the side wall plates above a line between the upper terminations of edges 204 and 206, are inclined outwardly through a compound curvature area 210 to provide a substantially planar intermediate portion 212 which is flared outwardly and is inclined downwardly toward the front of the hopper 22 immediately above the wheel contour (Figures 2 and 3). The intermediate edge portion 214 of the side plate front edge is inclined forwardly (Figure 3) from the lower front edge portion 202 and also inclines outwardly over the wheel area (Figure 5). The upper portion 216 of the side plate rear edge is inclined forward from the lower edge 206 (Figure 3) and is curved out and back in an S-shape 218 (Figure 5) corresponding to the rear wall S-shaped edge 182. Note the top extent of S-edge 218 is inclined slightly inwardly.

The upper edge portion 220 of the side plate front edge is straight, extends from a small curved edge portion 222 joining intermediate edge portion 214 and inclines rearwardly (Figure 3) and inwardly (Figure 5) corresponding to front wall upper edge portion 198. The side plate 32 has a second compound curvature area 224, above intermediate planar portion 212, extending between the upper curved edge of the S-shaped rear edge portion 218 and the curved front edge portion 222. The curvature area 224 passes into an upper planar portion 226 which extends between the top point of the S-shaped edge 218 and the straight upper front edge 220 and thus is inclined inwardly. The straight top edge 228 of side plate 32 is bent inwardly substantially horizontal to form a narrow inturned flange.

Side plates 32 and 34 can be shaped in a press and have an inwardly directed integral flange 230 (Figure 5) extending completely around the front edges 220, 222, 214, 204, lower curve 208 and rear edges 206 and 218. Prior to pressing a pre-cut plate, the edges can be notched to aid flow of metal. This pressed configuration results in a very rigid side plate with three dimensional edge lines and compound curvature areas. The edge flange 230 of each side plate is disposed within and welded to the shaped front bottom and rear wall member so the side plate edges 220, 222, 214, 204, 208, 206 and 218 coincide with the side edges 192, 196, 175, 177 and 182 of the front bottom and rear wall member. The joinder lines between front wall 36 and side plates 32 and 34 and between rear wall 40 and side plates 32 and 34 being three dimensional, the bulged front wall and the compound curvature of the side plates all combine in a unitary hopper 22 which is extremely rigid and resists deflection due to load and operation and the curved wall areas provide the front wall bulge 170 and side wall overhang bulges 234 which result in a greatly increased hopper capacity.

The top edge 236 of front wall 36 is extended above the level of the side plate top edges 228 and bent to the rear and down to provide a wind deflector, a smooth top edge and a trap above the front wall to aid in preventing loss of material from a full hopper. As hereinbefore described the handle assembly 30 is so arranged to tilt the hopper 22 forwardly in operation so the upper portion 178 of rear wall 40 is inclined slightly forward. This position also places the rear ends of the side plate top edges 228 higher than the front end, and thus provides slightly higher confining walls at the rear of hopper 22 to prevent overflow of material due to agitator action which tends to push material up the rear of the hopper. The upward convergence of the upper portions of front wall 36, rear wall 40 and side plates 32 and 34 tend to maintain material in a confined relation against overflow and the inturned front edge 236 and top side edge 228 create an overhang which is highly effective to prevent wind blown particles from leaving the hopper.

*Modified spreader*

Figures 11–18 illustrate a second embodiment of an adjustable, controllable rate, material spreader 250 having a hopper 252 which utilizes a front wall bulge and associated structural concepts in a manner similar to the aforedescribed spreader embodiment 20. Spreader 250 comprises the hopper 252, an agitator assembly 254, wheels 256, handle assembly 258, a shutter plate assembly 260 and a combination separable support leg and rate adjustment assembly 262.

Hopper 252 is made with three pieces, as in the aforedescribed hopper 22, two side plates 264 and 266 and a single piece comprising the front wall 268, bottom 270 and rear wall 272. Seen in Figures 13 and 14, the rear wall 272 is planar, has straight side edges 274 and with the lower portion 276 of front wall 268, which is also planar with straight side edges 278, are convergent downwardly at an acute angle. Bottom wall 270, integrally joining the front and rear walls 268 and 272, has a curved contour of circular longitudinal section (Figure 11) and with the convergent front wall portion 276 and rear wall 272 provide a curved bottom lateral straight trough.

With respect to front wall 268 (Figure 13), an intermediate wall portion 280 of planar form is inclined forwardly along a lateral bend line 282 of small radius curvature. The inclination of an upper planar portion 284 is reversed from that of intermediate portion 280 and directed rearwardly relative to a median plane between the lowermost inclined front wall portion 276 and rear wall 272. A lateral bend section 286 of larger radius curvature than bend line 282 provides the transition between the intermediate and upper front wall portions 280 and 284. The top lip 288 of front wall 268 curves to the rear and downwardly terminating in a lateral edge 290 which overhangs the interior of hopper 252. Similarly the top lip 292 of rear wall 272 curves forwardly and downwardly terminating in a lateral edge 294 which overhangs the interior of hopper 252.

Spreader 250 has side plates 264 and 266 which do not incorporate the bulge formed by the compound surface contours in the side plates 32 and 34 of the previously described embodiment, rather they have a planar configuration (Figures 14 and 16). In this respect each of the left and right hand sets of the side edges 296 of upper front wall portion 284, the side edges 298 of intermediate front wall portion 280, lower front wall side edges 278, bottom wall side edges 300 and rear wall side edges 274, lie in a common vertical plane. Hence the joinder line between each of side plates 264 and 266 and the single piece front, bottom and rear wall lies in a vertical plane.

The side plates have a straight rearwardly inclined rear edge 302, circularly curved bottom edge 304, lower straight forwardly inclined front edge 306, forwardly curved edge 308, intermediate forwardly inclined straight edge 310, reversely curved edge 312, rearwardly inclined upper straight front edge 314 and an essentially horizontal straight top edge 316 between the front and rear edges 314 and 302.

Integral with rear edge 302 is an inwardly bent flange 318 which fits outside of and is welded adjacent to the rear wall side edge 274. A shallow flange 320 is turned in from the side plate bottom curved edge 304, and fits inside the edge of and is welded to the curved bottom wall 270. A continuous front flange 322 is turned in from the side plate front edges 306, 308, 310, 312 and 314 and is disposed outside of and welded to the front wall 268. Thus the front, bottom and rear edges of side plates 264 and 266 in assembly are essentially contiguous with the side edges of front, bottom and rear walls 268, 270 and 272, and the welded joinder constitutes an essentially unbroken line of compound bends and curves providing a high strength hopper construction.

The entire extent of side plate top edges 316 have inturned flanges 324, the rear end of which is disposed over the inturned upper edge lip 292 of rear wall 272 and the front end of which is disposed under the edge 290 of the front wall upper lip 288. Notches 326 and 328 are provided between the lower circular flange 320 and each of side plate front and rear flanges 322 and 318 to permit the aforementioned external disposition of the front and rear flanges and internal disposition of circular bottom flange relative to the front, bottom and rear hopper walls.

The aforementioned construction results in a hopper 250 having a forward wall bulge 330. It does not have externally projected joinder or top edge flanges and thus utilizes the maximum overall hopper dimensions to furnish increased hopper capacity and eliminates external protrusions having sharp edges which could snag objects. Upper front wall lip 288 extends higher than the level of the top of side edges 316, providing a front wind deflector, and all of the hopper top edges overhang its interior to help retain windblown particles of contained material and to prevent upsurging overflow due to agitator action.

At the approximate radial center of the lower circularly curved end of each side plate, an opening 336 (Figure 16) with an externally extruded axially disposed flange 338 (Figure 14) is formed. A circular portion 340 of the side plate is recessed around and immediately adjacent each annular flange 338 to provide an inset abutment surface 342 and to provide added wall strength around the associated opening 336. A radially flanged bushing 344 is disposed in each opening 336 with its flange 346 on the inner side of the hopper. The bushings project beyond the side plate annular opening flanges 338 and provide pivotal support for depending apertured shutter bracket plates 348 which hang adjacent the side plate annular flanges 338 and are part of the shutter assembly 260 to be later described.

A lateral row of elongate apertures 350 in the hopper bottom wall 270 provide a material outlet. The edges 352 of the front ends of apertures 350 are convergent as in the first described embodiment shown in Figure 6.

Agitator assembly 254 (Figure 15) consists of a shaft 354 with two sets 356 of dual, laterally extending vanes 358 welded thereto. Each vane 358 extends from shaft 354 along a plane through the shaft axis. The ends 360 of shaft 354 extend beyond the sides of vanes 358 and project through and beyond side plate bushings 344 to rotatably journal the agitator assembly 254 within the hopper 252 adjacent its curved bottom wall 270. The rotational path of the radially outer edges of vanes 358 has a very slight clearance above the inner surface of bottom wall 270, and the vanes 358 extend laterally between side wall bushing flanges 346 with a free running clearance.

In this embodiment the bushings 346 and side plates 264 and 266 are assembled on shaft 354 of agitator assembly 254 and are then welded to the front, bottom and rear walls 268, 270 and 272. Shutter support plates 348 are then hung on the bushings 346 and the ground engaging wheels 256 mounted on the projected ends 360 of agitator shaft 354. One or both of the wheels 256, as desired, may be non-rotatable keyed as by a cotter pin 362 to shaft 354 to transmit wheel rotation to the agitator assembly 254.

Wheel driven rotation of the agitator assembly 254 causes vanes 358 to sweep down adjacent the front wall 268, from front to rear across the apertures 350 and up adjacent the rear wall 272.

Figure 11:
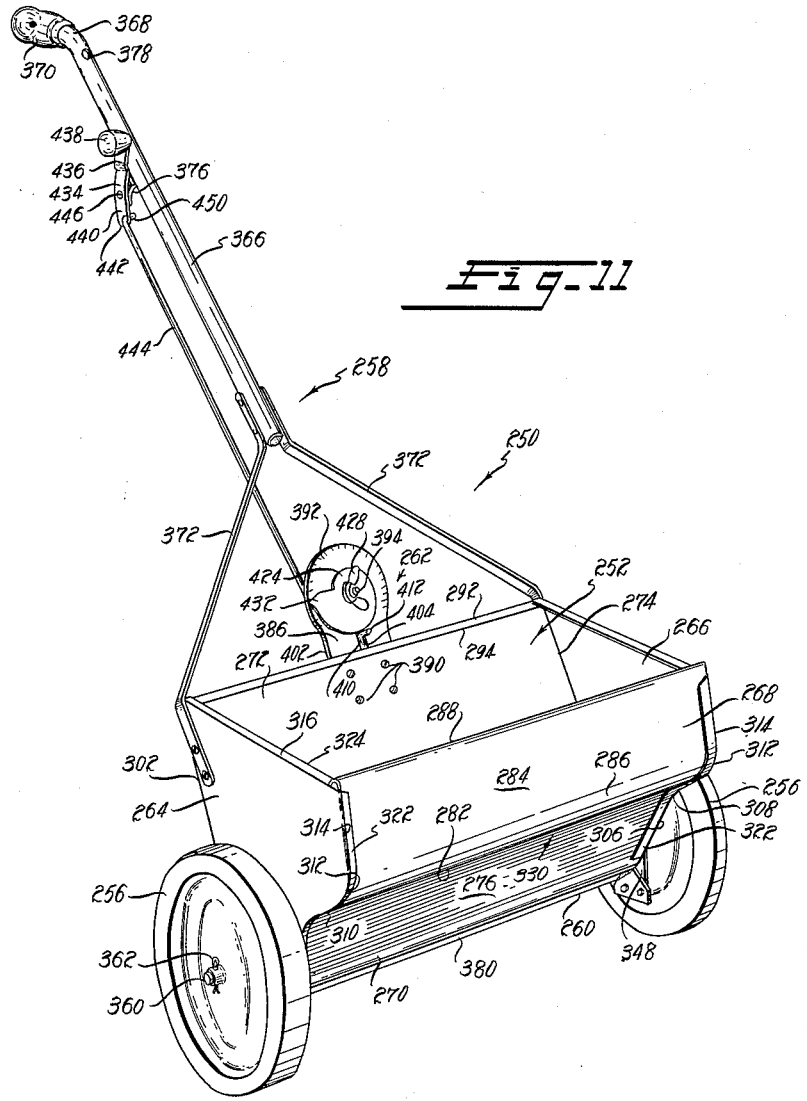
Figure 11 is a front perspective view of a second spreader embodying construction in accord with this invention.
Figure 12:
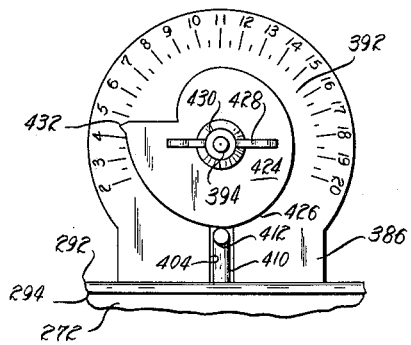
Figure 12 is an enlarged detail front view illustrating the adjustable cam of the rate mechanism on the spreader of Figure 11.

The handle assembly 258 is made with an upper tubular handle bar 366, with an end handle 368 inclined rearwardly, a grip 370 on handle 368 and two identical strap iron yoke members 372 secured to the lower end of handle bar member 366 as by bolts and nuts. Yoke members 372 are bent to bracket the upper rear hopper corners and are secured to the hopper side plates 264 and 266 by bolts 374 and nuts. A depending apertured bracket 376 is fastened as by welding to the tubular handle bar 366 intermediate its ends, the bracket being offset toward one side of handle bar 366, for a purpose to be later described. In Figure 11, the upper side of bar 366, adjacent bent end 368, has a hole 378 formed to facilitate hanging the spreader 250 during storage.

*Combined discharge and hopper support*

Shutter plate 380 (Figures 13 and 15) is contoured to have a snug pivotable fit below hopper bottom 270 and is adjustably fastened through screws, nuts and slots at each end (Figure 14) to the pivotable shutter side brackets 348 to swing over and cooperate with the lateral row of apertures 350 in the same manner as in the previously described embodiment. An apertured bracket 384 is centrally secured, as by welding, to the rear side of shutter plate 380.

Positive, adjustable, discharge rate control through variable, pivotable positioning of shutter 380 over apertures 350 is enabled by the combination support leg and rate control assembly 262 (Figures 13, 14 and 15). Assembly 262 is a separable preassembled unit which is designed for simplifying accurate installation on the hopper rear wall 272 midway between wheels 256. This arrangement enables disassembled shipment in a smaller container than would be necessary if the rate mechanism were fixedly secured to the hopper.

The support structure 386 for the rate mechanism is a single piece of sheet metal having a wide, flat, elongate portion 388 which engages and enables support 386 to be secured to the hopper rear wall 272 by four bolts and nuts 390. The upper end of the flat elongate portion 388 projects above the rear wall upper lip 292 and terminates in a circular platform 392. A forwardly extended threaded stud 394 is projected through the center of and welded to platform 392.

Below the lowermost mounting bolts 390, the flat portion 388 changes, through a curved leg portion 396, to a rearwardly inclined support foot 398 terminating in rounded end 400. The single piece support 386 includes an integral continuous rearwardly directed edge flange 402 extending from adjacent the circular platform 392 at the upper end, down the edges of the flat portion 388, the curved leg portion 396, the support foot 398 and around the end 400. Flange 402 provides necessary rigidity for support 386, enabling it to serve as both the rate control bracket and as the hopper support leg. Furthermore, being rigidly secured to the hopper rear wall 272, the wide flanged support 386 increases rear wall rigidity.

A vertical slot 404, formed in the platform portion 392 immediately below and aligned with stud 394, extends to a position approximately adjacent the hopper rear upper lip 292. The lower part of the elongate flat portion 388 has a partial cutout from which is formed a rearwardly disposed apertured lug 406, shown in Figure 14 in vertical alignment with the upper slot 404. A lower elongate slot 408 is formed in the upper part of the curved leg portion 396 and is in alignment with lug 406, upper slot 404 and stud 394 (Figure 14).

Disposed upwardly along the exterior of the hopper rear wall 272, a shutter control rod 410 projects through lower slot 408 and the apertured lug 406. The upper end 412 of rod 410 is bent forward approximately ninety degrees and projects through the upper circular platform slot 404. The lower end 414 of control rod 410 is bent laterally approximately ninety degrees and projects through the apertured shutter bracket 384. Note, control rod 410 is assembled in the combined support 386 before the support is mounted and secured on the hopper, and prior to securing the assembled support 386 and control rod 410 on the hopper rear wall 272, the lower control rod end 414 is fitted through the shutter bracket 384. When rod 410 and support 386 are secured as an assembly on the hopper, rod 410 is maintained in position by cooperation between upper end 412 and the sides of upper slot 404, the guiding relationship of rod 410 in the aperture of support lug 406, and the fore and aft retention of lower control rod end 414 in the aperture of shutter bracket 384. The control rod 410 cannot be removed from assembled position without disassembly or deliberate deformation of a spreader component. A cotter pin 416 and washer 418 are placed on lower rod end 414, and tend to hold the rod end 414 at a right angle to the shutter bracket 384 and this in turn holds the upper end 412 in a straight position in slot 404 where it strikes the rate cam, and provide increased overall accuracy.

Welded to the control rod 410, just below upper end 412, is a rearwardly disposed, laterally apertured lug 420. A compression spring 422, encircling rod 410, is stressed between control rod lug 420 and support lug 406 to bias control rod 410 upwardly. The upwardly directed spring bias on control rod 410 will tend to move shutter 380 to a position which will uncover the hopper outlet apertures 350.

A flat apertured cam 424 with a spiral cam edge 426 is rotatably mounted on the threaded stud 394 and against platform 392. Cam 424 is of sufficient dimension to be disposed over the upper slot 404 in the support platform 392. So positioned, the portion of cam edge 426 immediately below stud 394 will serve as an upper limit abutment for the upper control rod end 412 when rod 410 moves upward under spring bias. This control rod, and hence outlet control, limit can be varied by rotating the cam 424 on stud 394, and when a desired outlet opening position of shutter is determined the cam 424 can be clamped in position by tightening a wing nut 428 and washer 430 on threaded stud 394. The rise of cam edge 426 terminates in a radial pointer 432 which can be used in cooperation with indicia graduations placed around the circular platform 392 to enable adjustment to predetermined shutter positions by merely rotating the cam 424 to a marking corresponding to a known outlet opening setting and clamping it in position.

The means for moving shutter 380, between a position covering all hopper outlet apertures 350 and a spring biased position uncovering a forward portion of all hopper outlet apertures 350 as determined by cooperation between the control rod 410 and cam 424, is essentially the same as disclosed in the aforementioned Reissue Patent No. 24,189. It consists of an operating lever 434 with upper arm 436, fitted with a knob 438, and a lower arm 440 having an apertured end 442, and an operating rod 444.

Lever 434 is pivotally mounted (Figures 11 and 18) intermediate its ends on the side of handle assembly bracket 376 which is substantially vertically aligned with the side of tubular handle member 366, as by a bolt 446 and lock nut 448 cooperatively tightened to retain the lever 434, yet enable its free pivotal movement, on the bolt 446.

Operating rod 444 has its upper and lower ends, 450 and 452, laterally bent. The upper operating rod end 450 is pivotally fitted through the apertured end 442 of lower control lever arm 440 a sufficient distance to project laterally below the tubular handle member 366. Rod end 450 is retained in lever arm 440 by a washer 454 and cotter pin. The lower end 452 of operating rod 444 is pivotally fitted through the apertured control rod lug 420 and retained by a cotter pin.

When control lever 434 is moved to a position, as illustrated in Figure 18, where the bent end 450 of operating rod 444 engages the under side of tubular handle member 366, operating rod 444 and control rod 410 have been forced in a downward direction against the bias of spring 422 to a position in which shutter 380 has pivoted over and closed the row of outlet apertures 350. In such position, operating rod upper pivot end 450 has moved past a dead center position between the control lever pivot bolt 446 and the lower operating rod pivot end 452, providing an overcenter locking movement in the control linkage which prevents spring biased movement of the shutter 380 to an outlet open position.

To open the hopper discharge outlets 350 an operator moves the lever arm 436 up by means of knob 438. This action moves lower lever arm down until the operating rod upper pivot end 450 moves down over center, whereupon the bias of spring 422 will force the lever 434, operating rod 444, control 410 and shutter 380 to the outlet open position as determined by the adjustment of rate cam 424 for abutment by control rod upper end 412.

In the foregoing description there is provided novel spreader construction in which hopper capacity has been increased by creating specific bulges in various walls without increasing overall hopper dimensions thus saving storage and shipping space. The hopper has been made more rigid than previous hoppers as a result of the high strength and resistance to twisting and bending realized by deformations of walls and the resultant compound bends and/or curves where wall edges are joined. This strength is obtained without increasing the gauge of the hopper walls. The formed sheet metal legs and the combining of support leg structure with outlet rate adjustment mechanism enables production and assembly savings and certain changes in operative location and shape of control members enable a convenience of operation for the user.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spreader for distributing material comprising: a wheeled hopper having material distribution means with an adjustable outlet control; structural means fixed to said hopper for moving the spreader; an operating means for said outlet control; said hopper comprising front, rear and side walls, said front wall comprising an upper portion, an intermediate portion and a lower portion, said rear wall comprising an upper portion and a lower portion, at least said lower portion of said front wall and said lower portion of said rear wall being downwardly convergent, the inner surface of approximately the upper half of said front wall having a laterally disposed forward bulge provided by said intermediate portion of said front wall being inclined forwardly from said lower portion of said front wall, a transition bend joining said intermediate portion with said upper portion of said front wall and said upper portion of said front wall having a rearward inclination relative to said lower portion of said front wall, portions of the sidewalls of said hopper disposed above the hopper wheels having outwardly disposed bulges to provide a hopper overhang above each wheel, said side walls having edges shaped to conform with the rear wall and the front wall with the front edge of each side wall bulge portion matching the associated side edge of said front wall forward bulge, and means fastening said side wall to said front and rear walls.

2. A material distribution spreader as defined in claim 1, wherein the front and rear walls are structurally integral, the hopper bottom being curved and joining said convergent lower portions; the upper portion of said rear wall is inclined forwardly of the lower portion of said rear wall; and said upper portions of said front and rear walls provide an upwardly convergent configuration.

3. A material distribution spreader as defined in claim 1, wherein the joinder line between each of said side walls and said front wall constitutes a three-dimensional line, i.e., a line which cannot be disposed in a common plane.

4. A material distribution spreader as defined in claim 1, wherein a flange integral with the conformed edges of one of said joining walls is bent inwardly relative to said hopper and comprises at least part of said means fastening said side walls to said front and rear walls.

5. A spreader as defined in claim 1, wherein the upper edge of said front wall extends above the top edge of the remaining walls of said spreader and is turned back and down toward the inside of said hopper.

References Cited in the file of this patent

UNITED STATES PATENTS

| | | |
|---|---|---|
| Re. 24,189 | Peoples | July 31, 1956 |
| 445,734 | Schofield | Feb. 3, 1891 |
| 2,599,727 | Schmidt | June 10, 1952 |
| 2,641,383 | Coursey | June 9, 1953 |
| 2,678,145 | Juzwiak et al. | May 11, 1954 |
| 2,703,193 | Seltzer | Mar. 1, 1955 |
| 2,710,116 | Juzwiak | June 7, 1955 |
| 2,735,582 | Wilson | Feb. 21, 1956 |
| 2,762,535 | Kriegbaum | Sept. 11, 1956 |
| 2,801,772 | Schiebel | Aug. 6, 1957 |
| 2,828,052 | Foley | Mar. 25, 1958 |
| 2,840,275 | Liljenberg | June 24, 1958 |